US012084321B2

(12) United States Patent
Parks et al.

(10) Patent No.: US 12,084,321 B2
(45) Date of Patent: Sep. 10, 2024

(54) STAGE HOIST MOTOR ASSEMBLY

(71) Applicant: IWEISS, Fairview, NJ (US)

(72) Inventors: Richard Wiley Parks, Park Ridge, NJ (US); Ben William Marson, Turlock, CA (US); Ree Seminole, Portland, OR (US); Geoffrey Michael Stock, Manlius, NY (US)

(73) Assignee: IWEISS, Fairview, NJ (US)

( * ) Notice: Subject to any disclaimer, the term of this patent is extended or adjusted under 35 U.S.C. 154(b) by 0 days.

(21) Appl. No.: 17/885,010

(22) Filed: Aug. 10, 2022

(65) Prior Publication Data

US 2023/0052797 A1 Feb. 16, 2023

Related U.S. Application Data

(60) Provisional application No. 63/231,431, filed on Aug. 10, 2021.

(51) Int. Cl.

| | |
|---|---|
| ***B66D 1/12*** | (2006.01) |
| ***A63J 1/02*** | (2006.01) |
| ***B66D 1/20*** | (2006.01) |

(52) U.S. Cl.
CPC ................ *B66D 1/12* (2013.01); *A63J 1/028* (2013.01); *B66D 1/20* (2013.01)

(58) Field of Classification Search
CPC ... B66D 1/20; B66D 1/02; B66D 1/12; B66D 1/14; B66D 1/28; A63J 1/028
See application file for complete search history.

(56) References Cited

U.S. PATENT DOCUMENTS

| | | | | |
|---|---|---|---|---|
| 3,738,614 A * | 6/1973 | Peterson | .................. | B66D 1/20 254/365 |
| 2016/0257234 A1* | 9/2016 | Gomes | .................. | B60N 3/103 |
| 2018/0291716 A1* | 10/2018 | Su | .................. | B66D 1/20 |
| 2021/0316972 A1* | 10/2021 | Huang | .................. | B66D 1/28 |

FOREIGN PATENT DOCUMENTS

| | | | | |
|---|---|---|---|---|
| CN | 111099511 A * | 5/2020 | ............... | B66D 1/12 |
| DE | 10117466 A1 * | 10/2002 | ............... | B66D 1/12 |
| DE | 202013005539 U1 * | 8/2013 | ............... | B66D 1/20 |

* cited by examiner

*Primary Examiner* — Sang K Kim
*Assistant Examiner* — Nathaniel L Adams
(74) *Attorney, Agent, or Firm* — Carlson, Gaskey & Olds, P.C.

(57) ABSTRACT

A stage hoist motor assembly includes a first electric motor including a first brake and a second electric motor including a second brake. The first electric motor and the second electric motor are stacked one atop the other within a common plane. A cable winch is rotatable about a winch axis and includes a cable winch shaft that is driven by the first and second electric motors through respective ones of a first drive coupling and a second drive coupling. A width of the motors is less than a width of the winch. Moreover, the motors are stacked one atop the other within a common plane to provide a compact foot print that is favorable to use in performance venue environments.

19 Claims, 9 Drawing Sheets

STAGE HOIST MOTOR ASSEMBLY

CROSS REFERENCE TO RELATED APPLICATION

This application claims priority to U.S. Provisional Application No. 63/231,431 filed on Aug. 10, 2021.

TECHNICAL FIELD

The present disclosure relates to hoist assembly utilized in performance venues for lifting and moving items such as scenery items, curtains lighting and any other structures utilized as part of a performance venue.

BACKGROUND

Hoists are utilized in performance venues are sometimes referred to as a pile-on winch due to the cable stacking on itself as it is wound around a rotating drum. Most hoists are large to be adaptable to many different uses. The space required by such a hoist is amplified by the need for several hoists for different scenery items. Moreover, each hoist requires redundant safety brakes that can add to the cost, size and complexity of the hoist.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A stage hoist motor assembly according to a disclosed example embodiment includes a first electric motor including a first brake and a second electric motor including a second brake. The first electric motor and the second electric motor are stacked one atop the other within a common plane. A cable winch is rotatable about a winch axis. The cable winch includes a cable winch shaft that is driven by the first and second electric motors through respective ones of a first drive coupling and a second drive coupling. The integration of the motors and brakes provides for a smaller overall width. In one disclosed embodiment, a width of the motors is less than a width of the winch. Moreover, the motors are stacked one atop the other within a common plane to provide a compact foot print that is favorable to use in performance venue environments.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
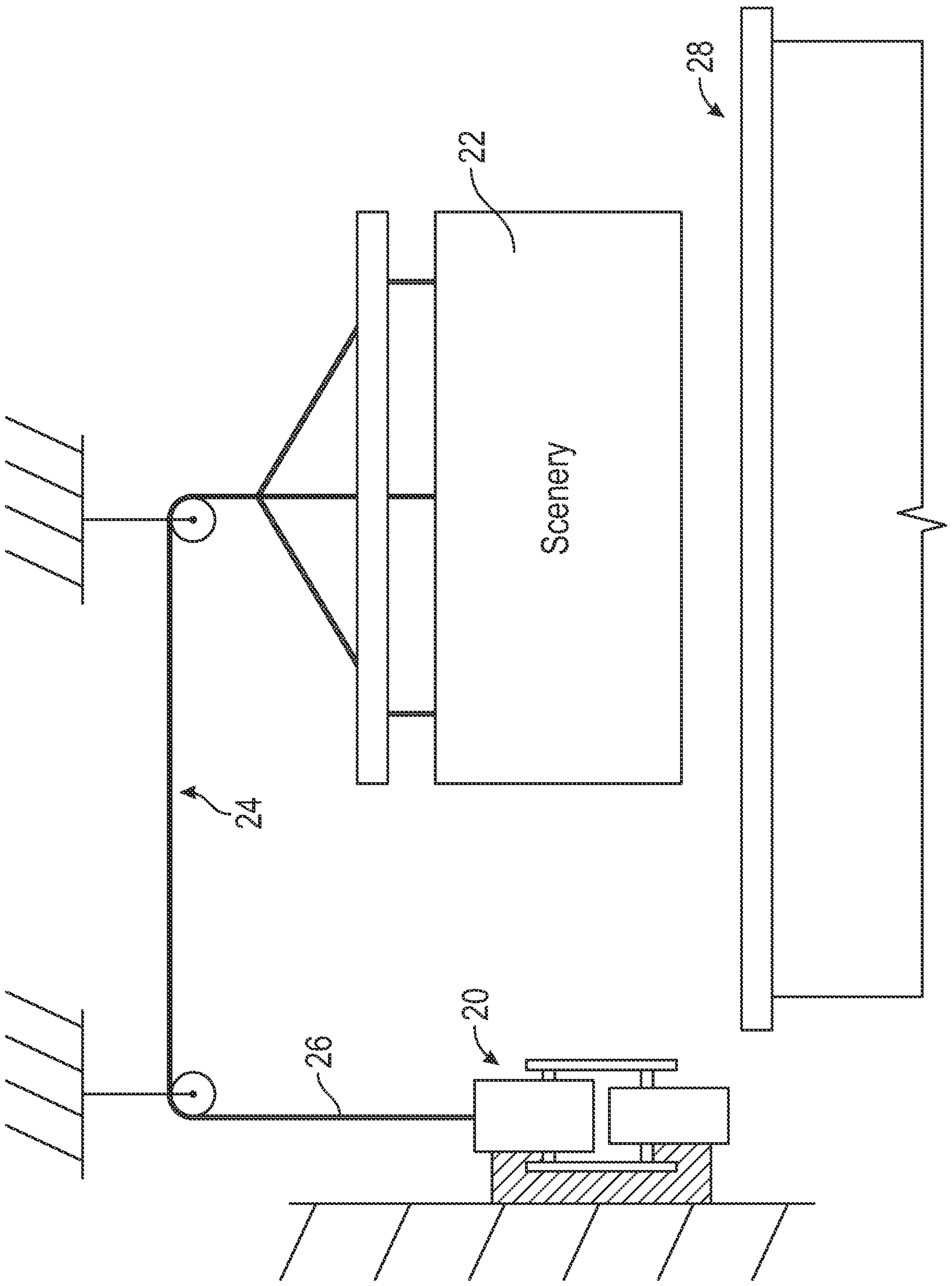
FIG. 1 is a schematic view of a performance venue including an example hoist motor assembly embodiment for moving scenery.

Referring to FIG. 1, a performance venue is schematically shown and includes a hoist motor assembly 20 for moving scenery 22. The hoist motor assembly 20 actuates a cable 26 of rigging 24 to move the scenery 22 relative to a stage 28. The hoist motor assembly 20 is mounted to a fixed static surface of the venue and is operable to move different scenery items through the rigging 24. It is typically not desirable to have the motor hoist assembly 20 viewable by an audience and therefore it is usually located back stage. The back stage area of a performance venue may be very small and therefore space for performers and equipment is a priority.

Figure 2:
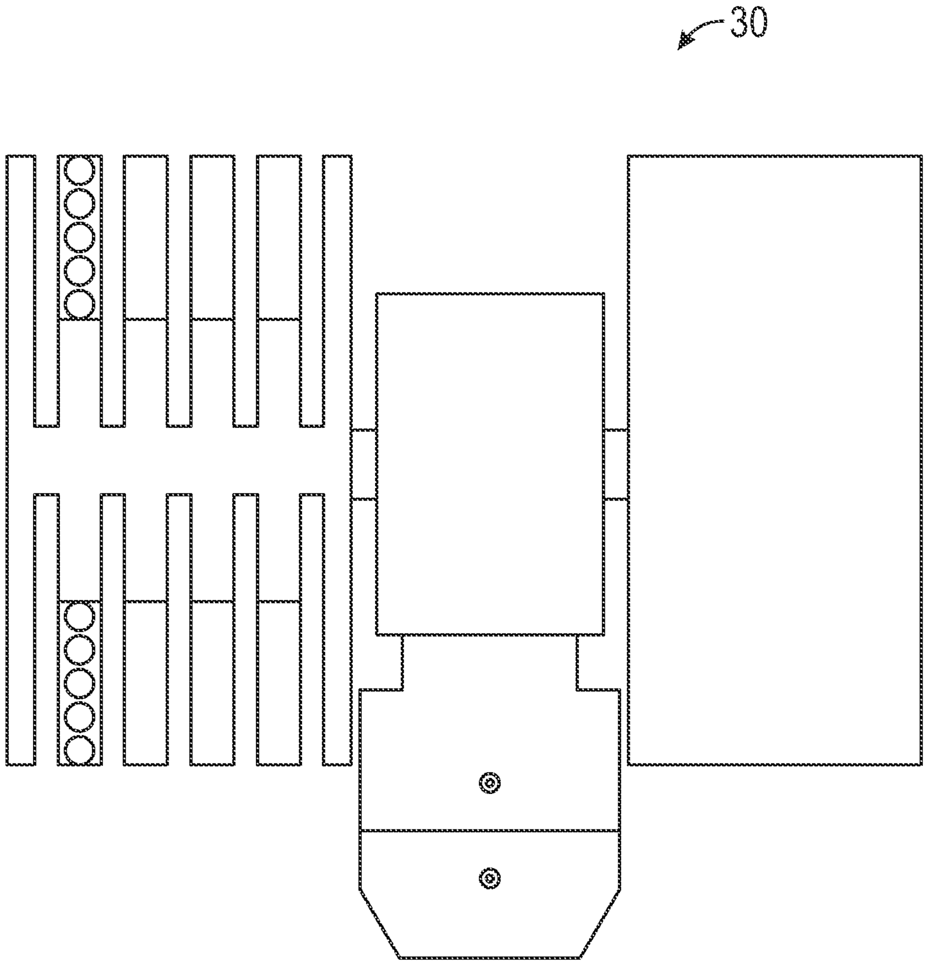
FIG. 2 (Prior Art)
FIG. 2 is a partial sectional view of a prior at hoist motor assembly.

Referring to FIG. 2, an example prior art hoist assembly 30 is schematically shown and includes a winch motor and brake all disposed along a common shaft. The total width of the hoist assembly 30 is therefore a combination of the width of each of these components. Moreover, although the motor includes a brake, a redundant secondary brake is provided as a backup. The additional features all contribute to the overall size of the hoist assembly 30.

Figure 4:
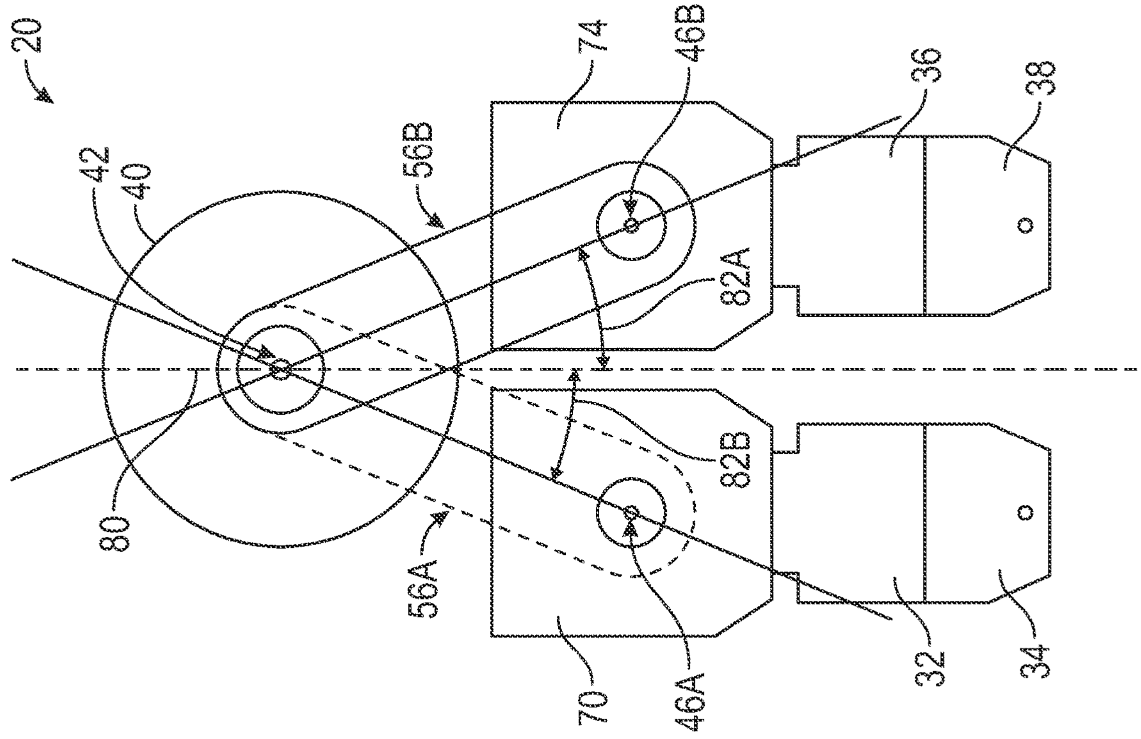
FIG. 4 is a side view of the example hoist motor assembly.
Figure 3:
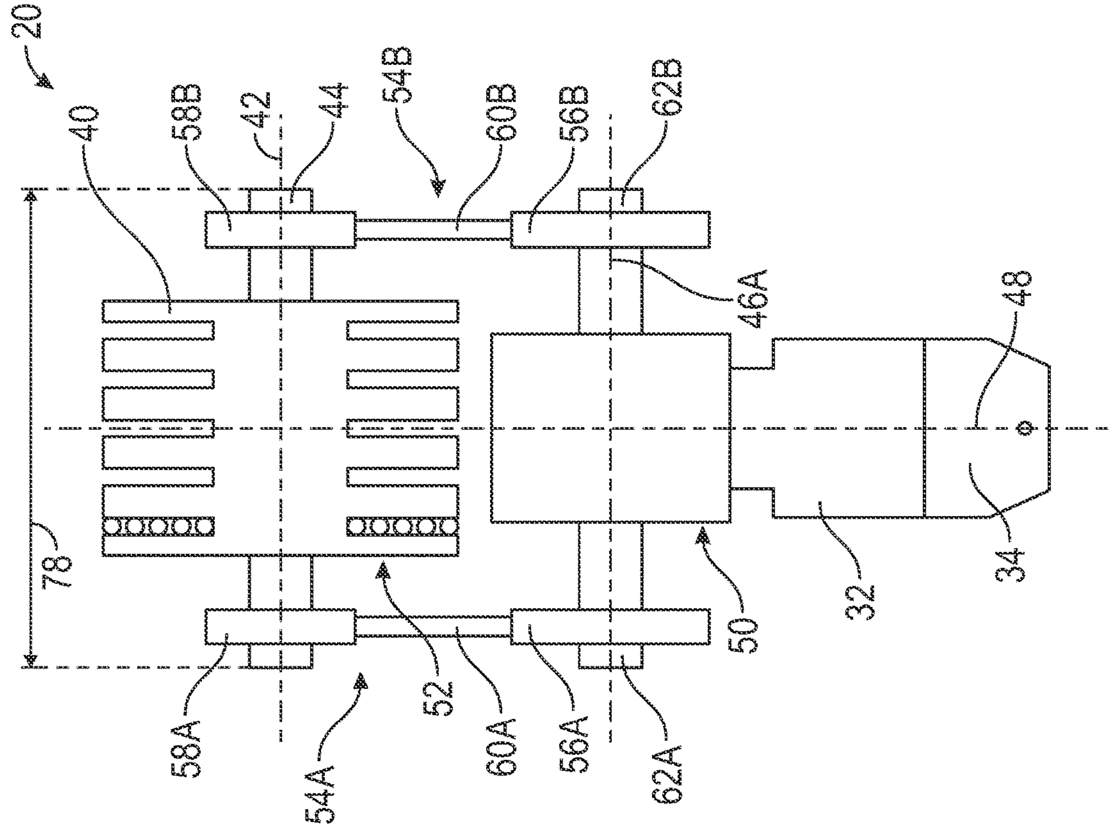
FIG. 3 is a schematic view of an example hoist motor assembly embodiment.
Figure 5:
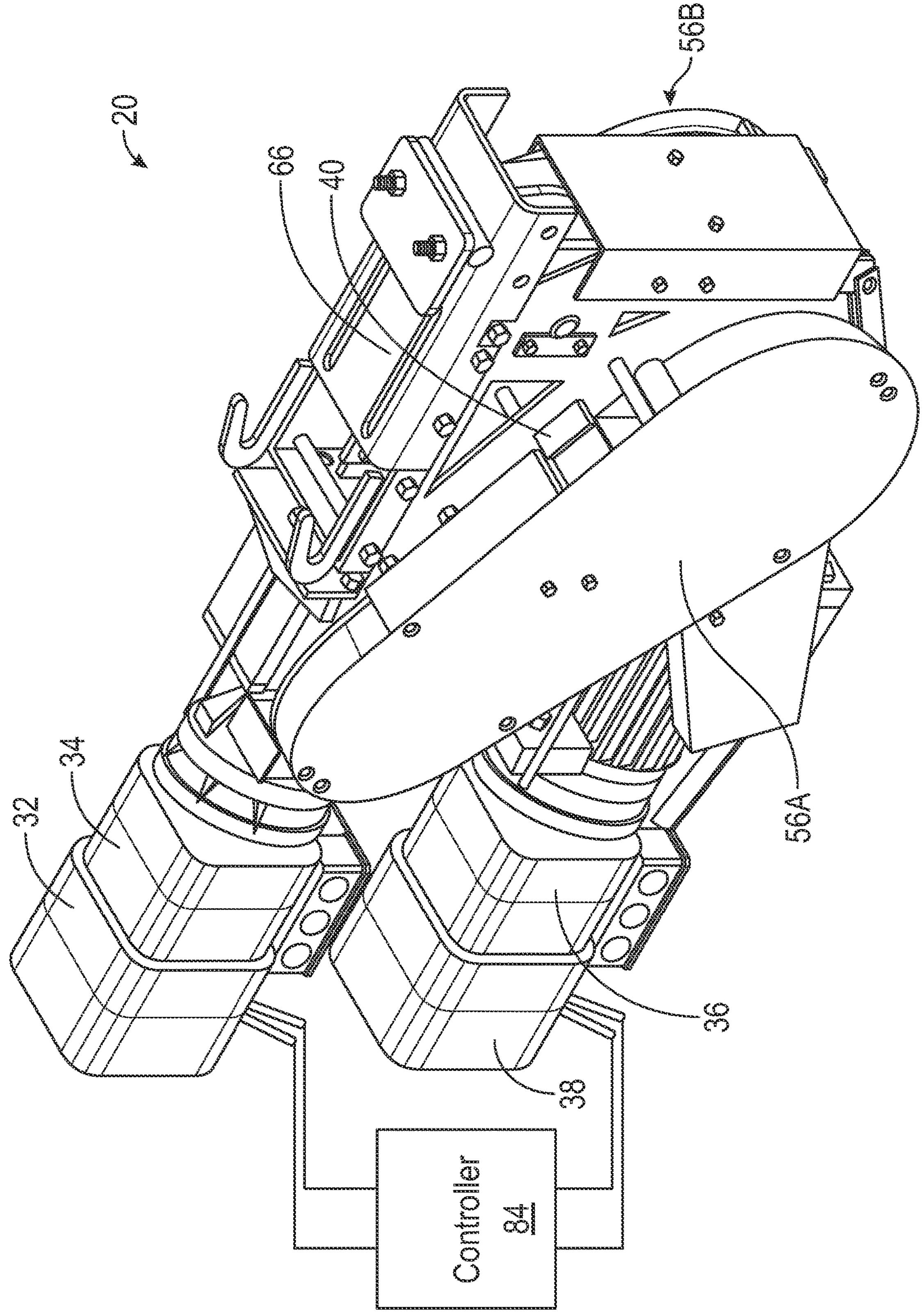
FIG. 5 is a perspective view of the example hoist motor assembly.
Figure 6:
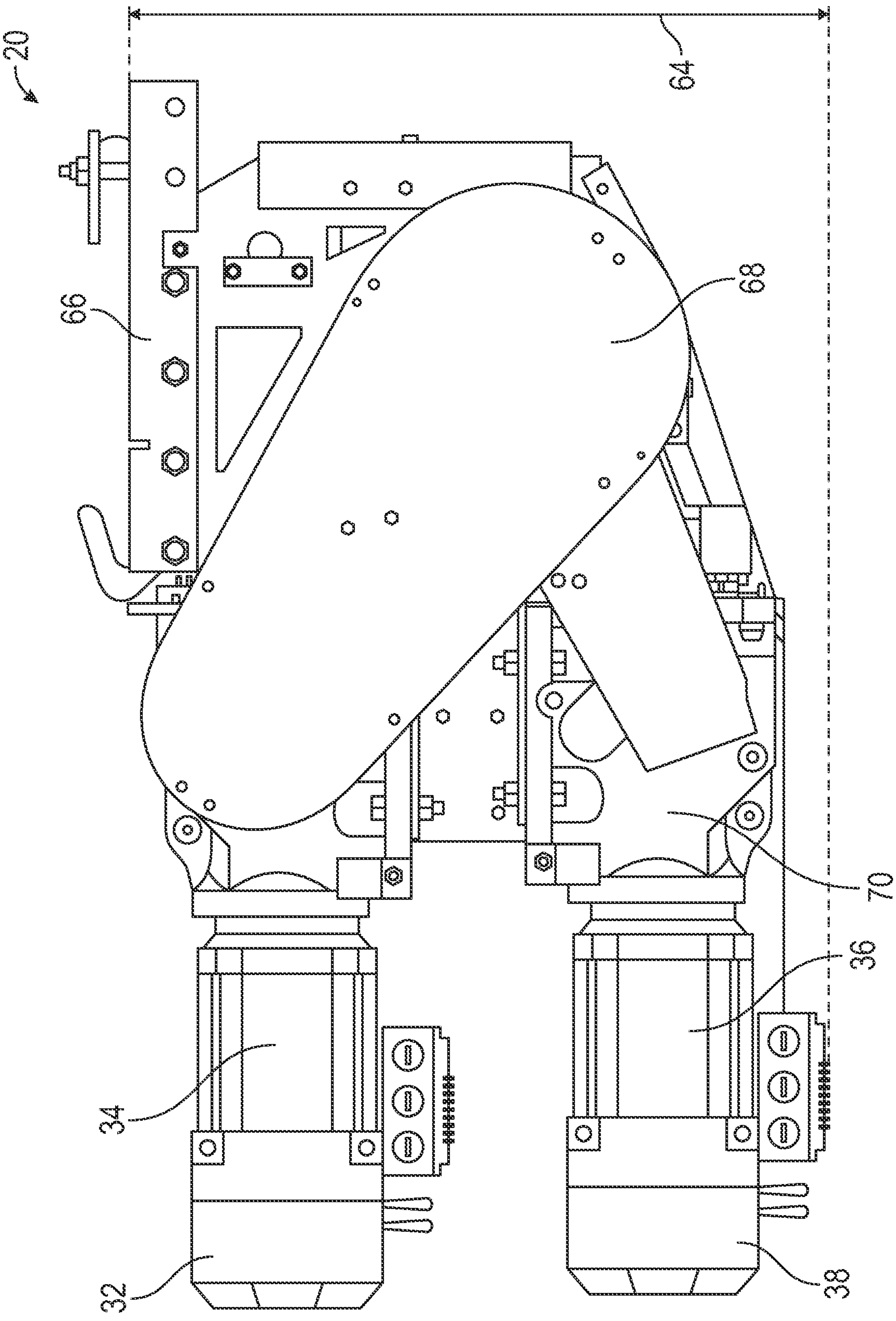
FIG. 6 is a front view of the example hoist motor assembly.
Figure 7:
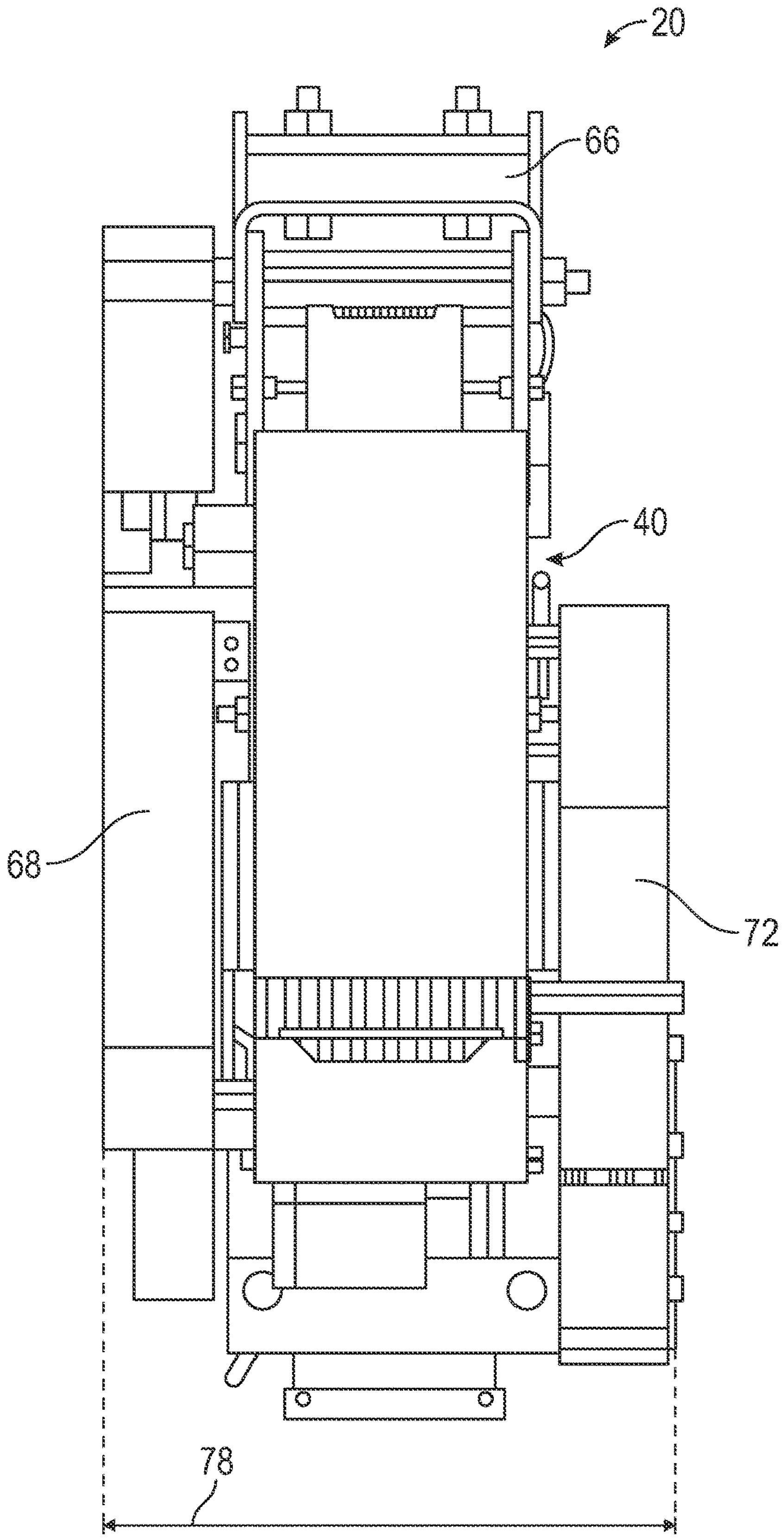
FIG. 7 is a side view of the example hoist motor assembly.
Figure 8:
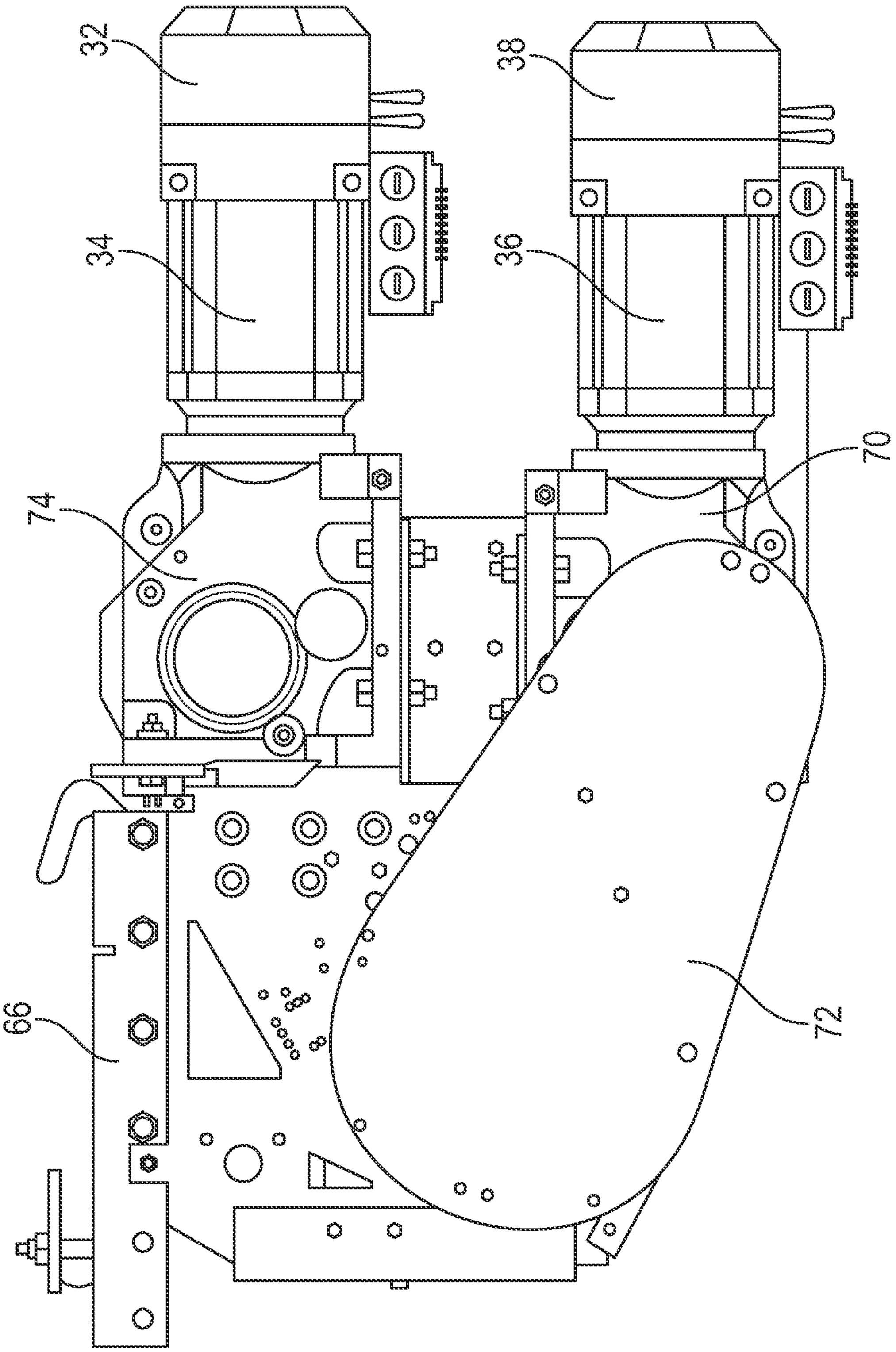
FIG. 8 is a back view of the example hoist motor assembly.
Figure 9:
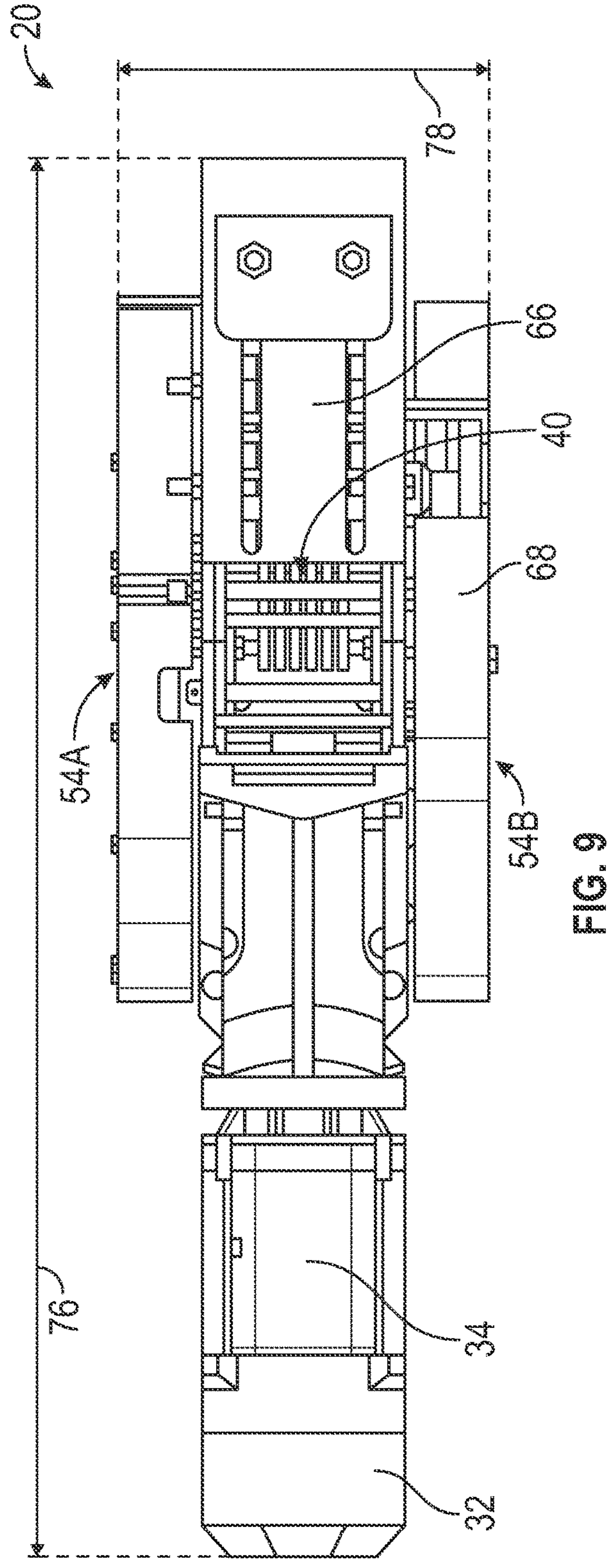
FIG. 9 is a top view of the example hoist motor assembly.
Figure 10:
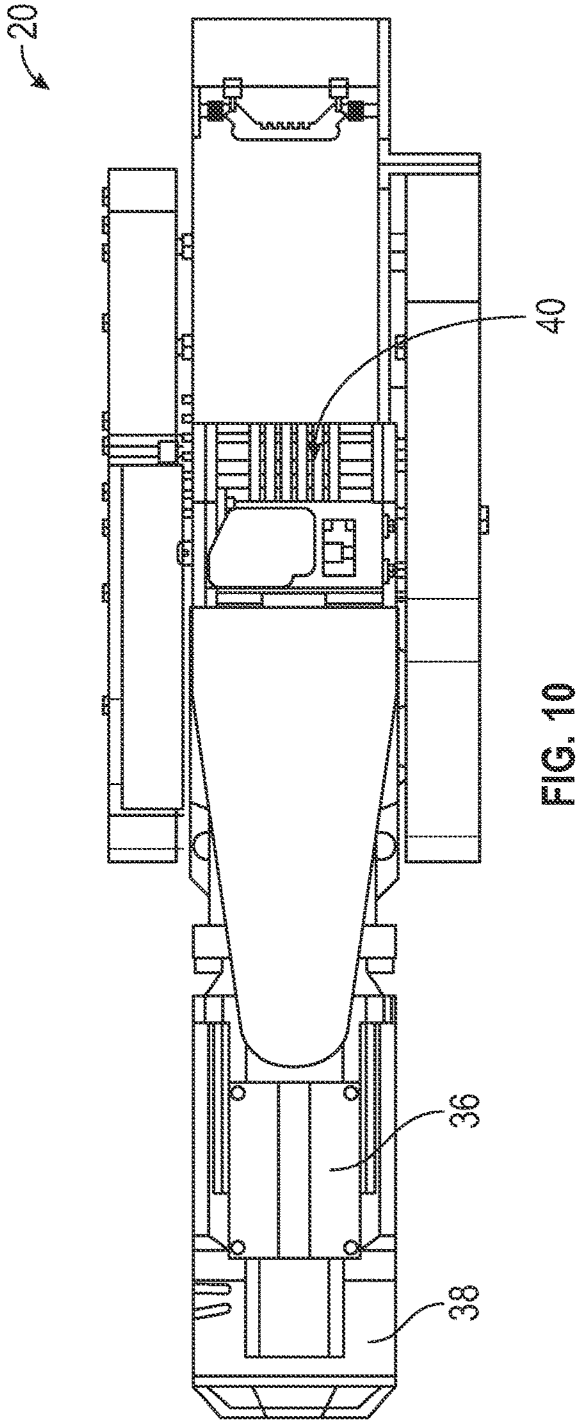
FIG. 10 is a bottom view of the example hoist motor assembly.

Referring to FIGS. 3, 4 and 5 an example hoist motor assembly 20 according to a disclosed example embodiment includes two electric motors that each include an integrated brake that is coupled to drive a cable winch 40. The cable winch 40 is supported by a winch shaft 44 for rotation about a winch axis 42. A first electric motor 32 and a second electric motor 36 are disposed within a common plane 48 that is transverse to the winch axis 42. The first electric motor 32 drives a first shaft 62A about a first drive axis 46A through a first gear box 70 and the second electric motor 36 drives a second shaft 62B about a second drive axis 46B through a second gear box 74. The first drive axis 46A and the second drive axis 46B are parallel to each other and transverse to a common plane 48.

The first electric motor 32 includes a first brake 34 and the second electric motor includes a second brake 38. The first brake 34 is also referred to and operates as a primary brake and the second brake 38 is referred to and operates as a secondary brake 38. Although in this disclosed example, the first brake 34 is a primary brake and the second brake 38 is a secondary brake, the roles and operation could be reversed within the contemplation and scope of this disclosure.

The integration of the motors 32, 36 and brakes 34, 38 provides for a smaller overall width. In this disclosed embodiment, a width 50 of the motors 32, 36 is less than a width 52 of the winch 40. The motors 32, 36 are stacked one atop the other within the plane 48 to provide the compact foot print that is favorable to use in performance venue environments.

The first motor 32 is coupled to the winch shaft 44 through a first coupling 54A. The second motor 36 is coupled to the winch shaft 44 through a second coupling 54B. The first coupling 54A is on one end of the winch shaft 44 and the second coupling 54B is on a second end of the winch shaft 44. The first and second couplings 54A, 54B each include a corresponding one of a drive sprocket 56A-B, a driven sprocket 58A-B and a drive chain 60A-B. A first cover 68 and a second cover 72 are provided to cover the respective drive chains 60A-B. Each of the motors 32, 36 are independently coupled to the winch shaft 44. The motors 32, 36 are both operated concurrently to drive the winch 40. Each of the motors 32, 36 remains coupled to the shaft 44 such that both brakes 34, 38 are always coupled to the winch shaft 44 and thereby able to apply braking force as needed. Both motors 32, 36 work together to provide power to actuate the winch 40.

A controller 84 (FIG. 5) is provided to control operation of each of the motors 32, 36. The controller 84 is programmed to operate each of the electric motors 32, 36 in unison. The controller 84 is further programmed to operate each of the primary brake 34 and the secondary brake 36 as needed to control operation of the winch 40. Moreover, the controller 84 may be programmed to operate the motors 32, 36 independently and continue to operate the primary brake 34 and secondary brake 38 to control operation of the winch 40.

Because the motors 32, 36 are disposed in the common plane 48 that is transverse to the winch 40, the couplings 54A-B are disposed at respective angles 82A-B relative to a longitudinal plane 80 shown in FIG. 4. In one disclosed embodiment, the angles 82A-B are the same and are each less than about 45 degrees. In another disclosed example embodiment, the angles 82A-B are both between 30 degrees and 40 degrees. In another example embodiment, the angles 82A-B are both 35 degrees. However, other angles could be utilized and are within the contemplation of this disclosure. Additionally, although the angles 82A-B are the same in this disclosed example, it is within the scope and contemplation of this disclosure that the angles 82A-B may be different to tailor the assembly 20 to application specific space limitations.

Referring to FIGS. 6-10 with continued reference to FIG. 5, the disclosed hoist motor assembly 20 includes a height 64 (FIG. 6), an overall length 76 and an overall width 78. The overall length 76 is greater than the overall width 78. The height is greater than the width 78. In one disclosed example embodiment, the height 64 is approximately twice the width 78 and the length 76 is approximately four times the width 78. In another disclosed embodiment, the height 78 is between 1¾ and 2¼ times greater than the width 78 and the length 76 is between 3¾ and 4¼ times greater than the width 78. The relative dimension provides a compact assembly with a flatter profile provides for incorporation within many different rigging configurations.

The winch 40 is disposed within a housing 66. The housing 66 provides for support of the winch 40 and is attached to a first gearbox 70 and a second gearbox 74. The motors 32, 36 are mounted to the respective ones of the first and second gearboxes 70, 74. The first and second gearboxes 70, 74 include gearing to transfer rotational torque produced by the corresponding electric motors 32, 36 transversely into shafts 62A-B (FIG. 3) to drive the respective couplings 54A-B.

The gearboxes 70, 74 may include reduction gearing to provide an output speed of each of the shafts 62A-B that is a predefined ratio of the input rotational speed of each of the electric motors 32, 36. In one disclosed example embodiment, both the first and second gearboxes 70, 74 include the same gear reduction ratio. In another disclosed example embodiment, the first and second electric motors 30, 32 are of a different size and the first and second gearboxes 70, 74 include different gear reduction ratios.

Although the couplings 54A-B are disclosed as a chain and sprocket drive system, other couplings such as a belt drive, shaft drive, gear coupling or any other mechanical drive coupling could also be utilized and is within the contemplation of this disclosure.

Figure 11:
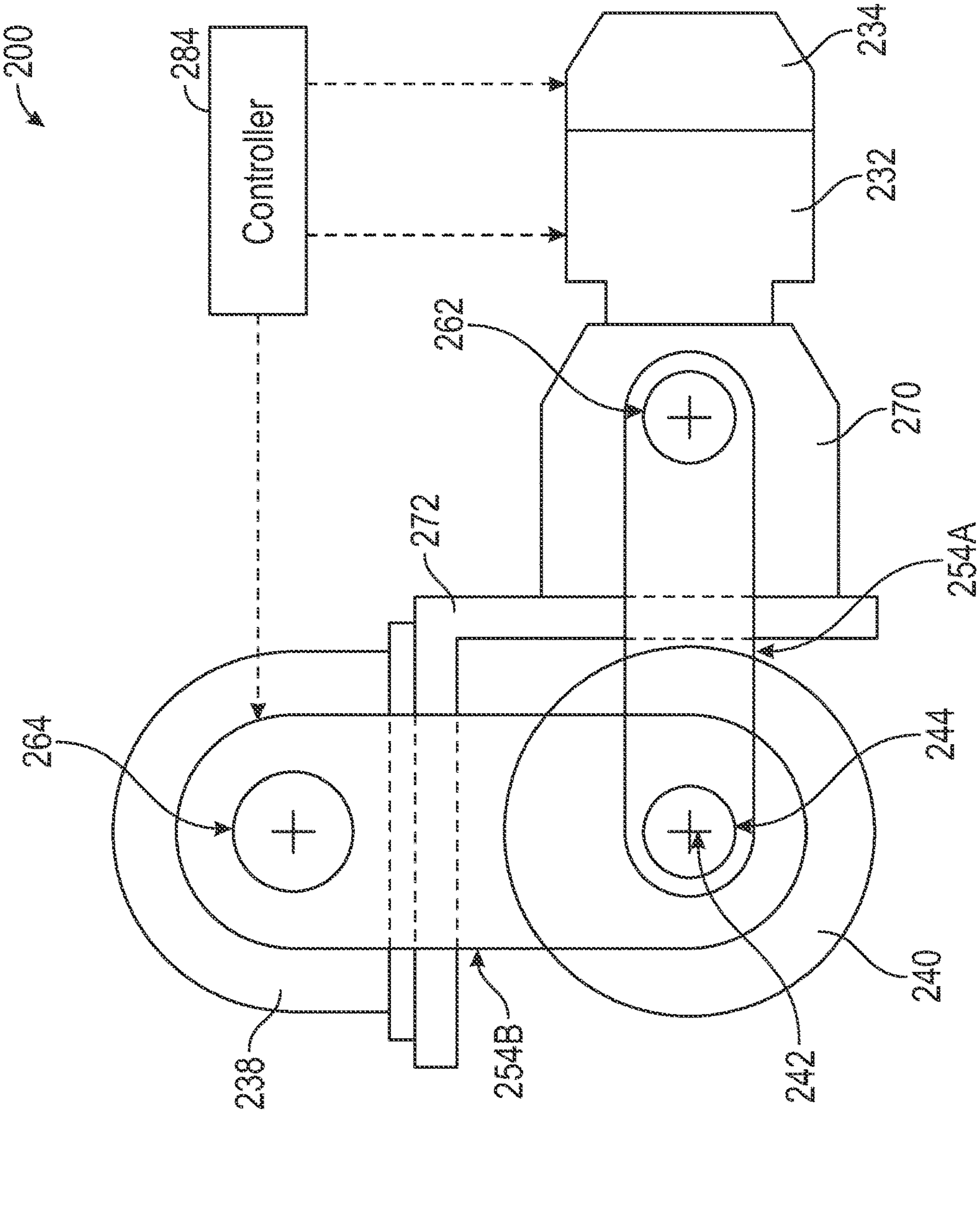
FIG. 11 is a schematic front view of another example hoist motor assembly embodiment.
Figure 12:
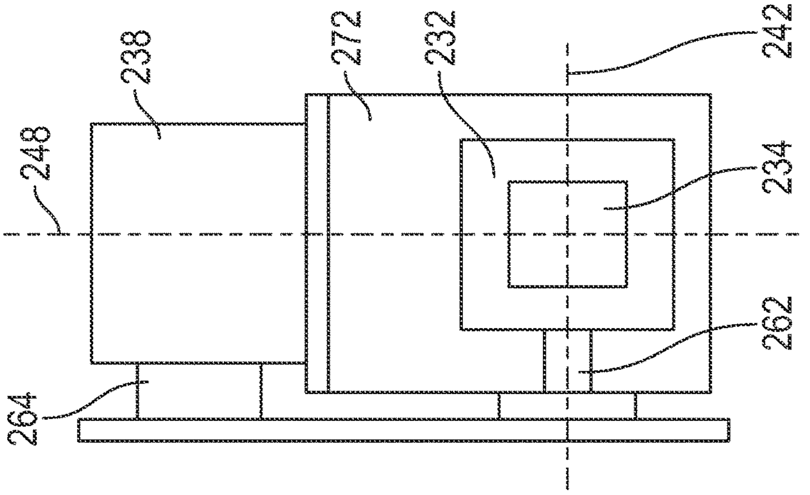
FIG. 12 is a schematic side view of the example hoist motor assembly of FIG. 11.

Referring to FIGS. 11 and 12, another example hoist motor assembly embodiment is schematically shown and indicated at 200. The hoist motor assembly 200 includes an electric motor 232 with a first brake 234. The electric motor 232 is configured to drive a gearbox 270 that is mounted to a bracket 272. The bracket 272 is substantially "L" shaped and provides for the mounting of a second brake 238. A winch 240 includes a winch shaft 244 disposed along a winch axis 242. The electric motor 232, first brake 234 and the second brake 238 are disposed within a common plan 248 that is transverse to the winch axis 242. The relative orientation between the winch 240, electric motor 232, first brake 234 and the second brake 238 provide a compact assembly that expands mounting options to provide for adaptation to any venue configuration.

In this disclosed example, the electric motor drives a shaft 262 through the gear box 270. The shaft 262 is coupled to the winch shaft 244 through a first drive link 254A. The second brake 238 is coupled to a brake shaft 264. The brake shat 264 is coupled to the winch shaft 244 through a second drive link 254B. The electric motor 232, first brake 234 and the second brake 238 are in communication with a controller 284. The controller 284 is programmed to control operation of the winch 240 by controlling the electric motor 232, the first brake 234 and the second brake 238. The first brake 234 is configured to operate as the primary brake and the second brake is configured to operate as a secondary brake. Additional features of the hoist motor assembly 20 discussed above are applicable and may be incorporated into the example hoist motor assembly 200.

Accordingly, the example hoist motor assemblies 20, 200 provide a compact device that provides additional mounting and placement options while also improving operational functionality Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A stage hoist motor assembly comprising:

a first electric motor including a first brake;

a second brake;

a cable winch that is rotatable about a winch axis;

a first drive coupling between the first electric motor and the cable winch; and a second drive coupling between the second brake and the cable winch, wherein the first electric motor and the second brake are both centered along a common plane disposed transverse to the winch axis, wherein the assembly is of a longitudinal length that is between 3¾ and 4¼ times a greatest width of the assembly in a direction parallel to the winch axis.

2. The stage hoist motor assembly as recited in claim 1, including a second electric motor and the second brake is coupled to the cable winch through the second electric motor.

3. The stage hoist motor assembly as recited in claim 2, wherein the cable winch includes a winch shaft disposed along the winch axis, the winch shaft including a first end coupled to the first drive coupling and a second end coupled to the second drive coupling.

4. The stage hoist motor assembly as recited in claim 2, wherein the first drive coupling and the second drive coupling are disposed at an angle relative to the winch axis.

5. The stage hoist motor assembly as recited in claim 4, wherein the first drive coupling and the second drive coupling each comprise a drive chain coupling a drive sprocket to a driven sprocket.

6. The stage hoist motor assembly as recited in claim 5, including a first gearbox coupled to be driven by the first electric motor and a second gearbox coupled to be driven by the second electric motor and both the first gearbox and the second gearbox are centered along the common plane.

7. The stage hoist motor assembly as recited in claim 2, wherein the first electric motor and the second electric motor include a width in a direction parallel to the winch axis that is less than the cable winch.

8. The stage hoist motor assembly as recited in claim 2, including a controller programmed to govern operation of the first electric motor, the first brake, the second electric motor and the second brake.

9. The stage hoist motor assembly as recited in claim 8, wherein both the first electric motor and the second electric motor are operated at the same time to drive the winch.

10. The stage hoist motor assembly as recited in claim 1, wherein the assembly is of a height that is between 1¾ and 2¼ the greatest width.

11. The stage hoist motor assembly as recited in claim 1, wherein the first brake operates as a primary brake and the second brake operates as a secondary brake to control operation of the winch.

12. A stage hoist motor assembly comprising:

a first electric motor including a first brake;

a second electric motor including a second brake, wherein the first electric motor and the second electric motor are stacked one atop the other within a common plane;

a cable winch that is rotatable about a winch axis;

a first drive coupling between the first electric motor and the cable winch; and a second drive coupling between the second electric motor and the cable winch, wherein the cable winch includes a winch shaft disposed along the winch axis, the winch shaft including a first end coupled to the first drive coupling and a second end coupled to the second drive coupling and a longitudinal length of the assembly including both the first electric motor, the second electric motor and the cable winch is between 3¾ and 4¼ times a greatest width of the assembly in a direction parallel to the winch axis.

13. The stage hoist motor assembly as recited in claim 12, wherein the assembly is of a height that is between 1¾ and 2¼ the greatest width.

14. The stage hoist motor assembly as recited in claim 13, wherein the height is twice the greatest width and the length is four times the greatest width.

15. The stage hoist motor assembly as recited in claim 13, wherein the first brake operates as a primary brake and the second brake operates as a secondary brake to control operation of the winch.

16. The stage hoist motor assembly as recited in claim 14, wherein the first drive coupling and the second drive coupling are disposed at an angle relative to the winch axis.

17. The stage hoist motor assembly as recited in claim 16, including a first gearbox driven by the first electric motor and coupled to the first drive coupling and a second gearbox driven by the second electric motor and coupled to the second drive coupling.

18. The stage hoist motor assembly as recited in claim 17, wherein each of the first gearbox and the second gearbox include the same gear reduction gear ratio.

19. The stage hoist motor assembly as recited in claim 12, including a controller programmed to govern operation of the first electric motor, the second electric motor, the first brake and the second brake.

* * * * *